United States Patent [19]

Muscat

[11] Patent Number: 4,573,732
[45] Date of Patent: Mar. 4, 1986

[54] CONVERTIBLE TOP FRAME

[76] Inventor: Peter P. Muscat, 441 Highview St., Dearborn, Mich. 48128

[21] Appl. No.: 605,070

[22] Filed: Apr. 30, 1984

[51] Int. Cl.$^4$ ............................................... B60J 7/12
[52] U.S. Cl. ..................................... 296/108; 296/116
[58] Field of Search .................................. 296/107–117

[56] References Cited

U.S. PATENT DOCUMENTS

| | | | |
|---|---|---|---|
| 2,697,633 | 12/1954 | Slason | 296/116 |
| 3,473,842 | 10/1969 | Bracey et al. | 296/116 |
| 3,994,524 | 11/1976 | Lehmann | 296/116 |

Primary Examiner—Robert R. Song
Attorney, Agent, or Firm—John R. Benefiel

[57] ABSTRACT

A folding frame for convertible top motor vehicles which stows compactly so as to minimize loss of passenger compartment space, the frame formed by a pair of pillar members pivotally anchored in body spaces alongside the rear passenger compartment, each pillar member having a unitary side rail pivotally connected to its upper end and extending forwardly above and alongside the passenger compartment with the frame in the raised position. The connected pairs of pillar members and side rails define a side window opening, and support a plurality of bow members over which the top material is stretched to enclose the passenger compartment. The pillar members each pivot to the rear in lowering the frame, while the side rails pivot forward into body spaces alongside the rear of the passenger compartment, with an intermediate top and header bow member swung to the rear by a swing arm linkage system as the side rails are pivoted forward to stow these bow members in the body space directly to the rear of the passenger compartment. Rear bow members are drawn into position for stowage in the rear body space by linkages operated by the downward pivoting motion of the pillar members to also be positioned in the body space to the rear of the passenger compartment for stowage.

13 Claims, 14 Drawing Figures

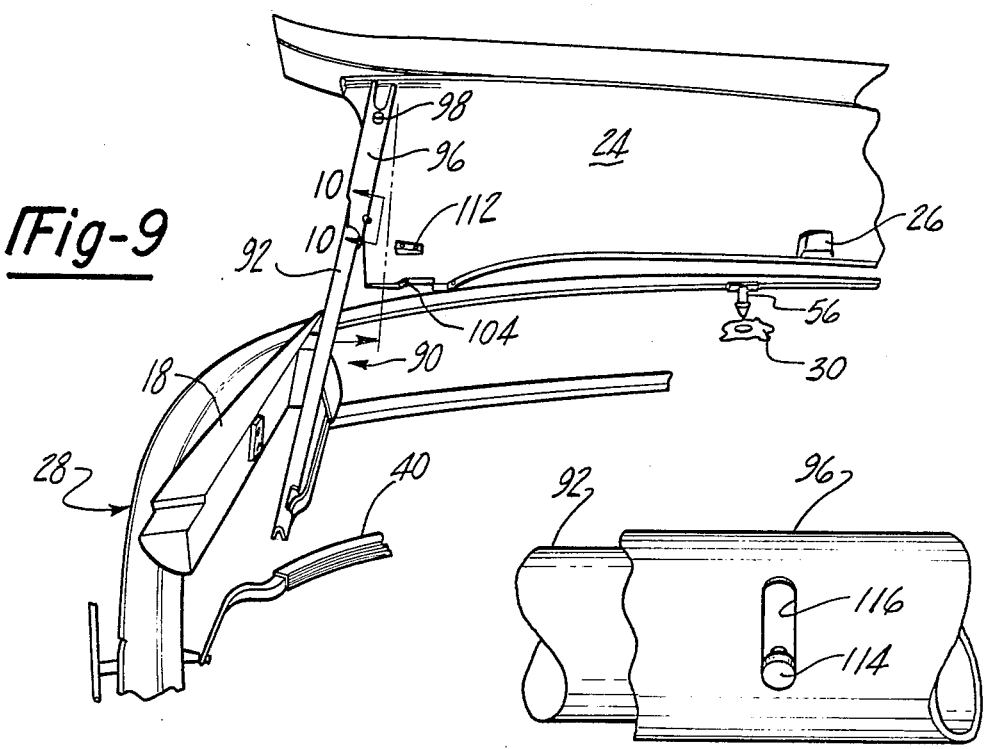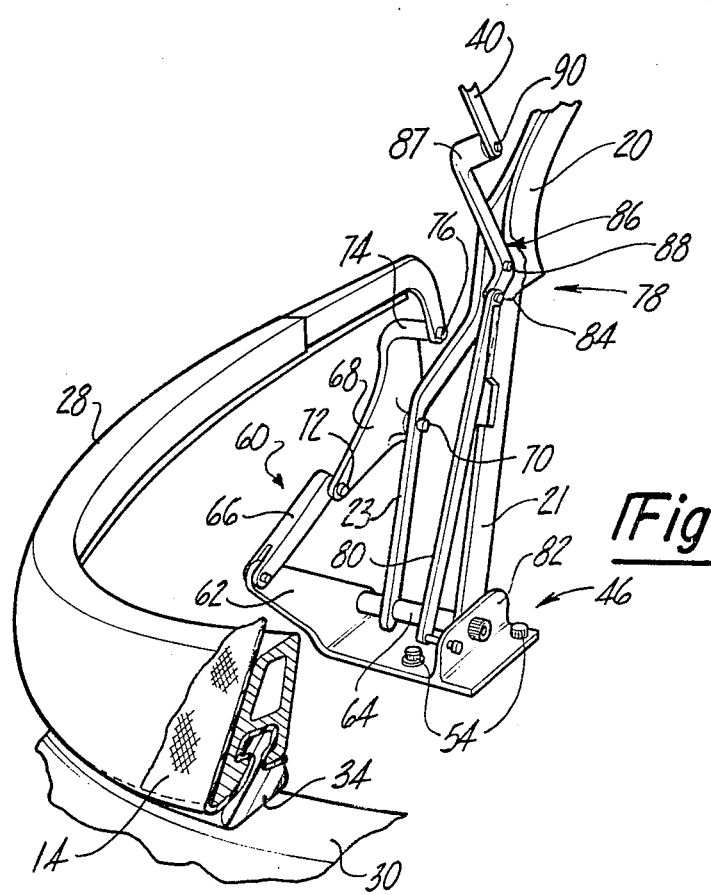

000
CONVERTIBLE TOP FRAME

BACKGROUND DISCUSSION

This invention concerns motor vehicle body tops and more particularly a foldable frame for convertible tops of the type adapted to be raised to support a fabric top material enclosing the passenger compartment and lowered and collapsed such as to be stowed in vehicle body spaces adjacent the passenger compartments.

Conventional convertible top frames consisted of hinged side frame members which essentially fold into the space to the rear of the passenger compartment upon lowering of the top. This configuration requires a relatively large space for stowage of the top frame and fabric in the lowered position.

The relatively great space required for stowage often times leads to a reduction in the rear seat area. As automobiles have been downsized, the available body space for stowage of such convertible tops has been reduced and the reduction in space sometimes requires complete elimination of a rear seat area. In the down position, such conventional designs produce relatively bulky vertical lines, i.e., a pronounced hump results, located to the rear of the passenger compartment which compromises the styling of the automobile.

The hinged sections also tend to cause sealing problems between the top fabric and the convertible top frame as continuous seals cannot be employed due to the presence of the hinged joints.

A further difficulty has been encountered with the recent downsizing of vehicles, in that such tops are typically manually operated and the leverage in manually raising the top frame is such as to cause relative difficulty to the average strength individual.

The hinged section top frames do not offer smooth clean lines when viewed from the interior of the vehicle.

Accordingly, it is an object of the present invention to provide a convertible top frame for motor vehicle bodies which may be stowed very compactly even in downsized vehicles to minimize or eliminate reductions in passenger compartment area necessary for stowage in particularly the rear seat passenger compartment.

It is still another object of the present invention to provide a convertible top frame allowing relatively trim body contours with the convertible top stowed, such as to improve the aesthetics of the vehicle body lines.

It is yet another object of the present invention to provide a convertible top frame which affords good leverage for manual raising of the convertible top to make such raising easily accomplished by individuals of average or below average strength.

It is still another object of the present invention to provide a convertible top frame which does not employ hinged framing members such as to improve weather sealing.

SUMMARY OF THE INVENTION

These and other objects of the present invention, which will become apparent upon a reading of the following specification and claims, are achieved by a convertible top frame consisting of a pair of pillar members which are pivotally anchored within sidewell body spaces on either side of the passenger compartment so as to be able to be swung to the rear and downwardly from the raised position in which the pillar members extend substantially vertically. A pair of unitary side rail members are also provided, each side rail being pivotally connected to the upper end of a respective pillar member and extending forwardly so as, together with the pillar member, to define a side window opening with the top frame in the raised position.

The connect pairs of pillar members and side rails together support a series of elongated bow members extending across the passenger compartment, with a header bow member extending atop recesses in the leading ends of the side rails and carrying a latching mechanism.

The top frame is lowered and collapsed by a two-stage movement; firstly, by pivoting the side pillar members to the rear to extend substantially horizontally back into a body space stowage area behind the passenger compartment; and, secondly, the side rails are moved downward and forward by being pivoted about an axis which is skewed such that the free ends of the side rails move outwardly into side well body spaces as they are folded down to horizontal position.

This arrangement affords a very compact stowage space requirement.

As the side rails are pivoted forwardly, the header member and an adjacent intermediate bow member are both swung rearwardly on a pair of swing arm assemblies, each connected to side rail and pillar members and mounted to a respective side rail to swing the header and intermediate bow member into the body space to the rear of the passenger compartment. The swing arm linkage accommodates the changing angle between produced as the side rails move outwardly on the respective skewed pivot axis.

The intermediate top bow member is hinged to the header member and folds atop the underside of the header member as the header member is moved into an inverted position within the rear body space.

A rear top bow member also extends between the point of connection between each of the side rails and pillar members, and are drivingly connected by means of linkages which cause a corresponding rotation of the side rails as either side rail is moved to the collapsed position.

A plurality of rear bow members are also carried on linkages which draw these bow members into position in the rear body space as the pillar members are pivoted to the down position.

The unitary construction of the side rails and pillar members affords good weather sealing of the convertible roof fabric to minimize leakage problems. The leverage able to be exerted by the relatively long side rails and pillar members allows easy manual raising of the frame.

DESCRIPTION OF THE DRAWINGS

FIG. 5 is a fragmentary perspective view of a portion of the convertible top frame according to the present invention showing the rear bow operating linkages.

FIG. 9 is a fragmentary endwise perspective view of the portion of the convertible top frame shown in FIGS. 7 and 8.

FIG. 10 is a fragmentary enlarged view of a portion of the linkages shown in FIG. 9 taken in the view 10—10.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should be not so constructed inasmuch as the invention is capable of taking many forms and variations within the scope of the appended claims.

Figure 1:
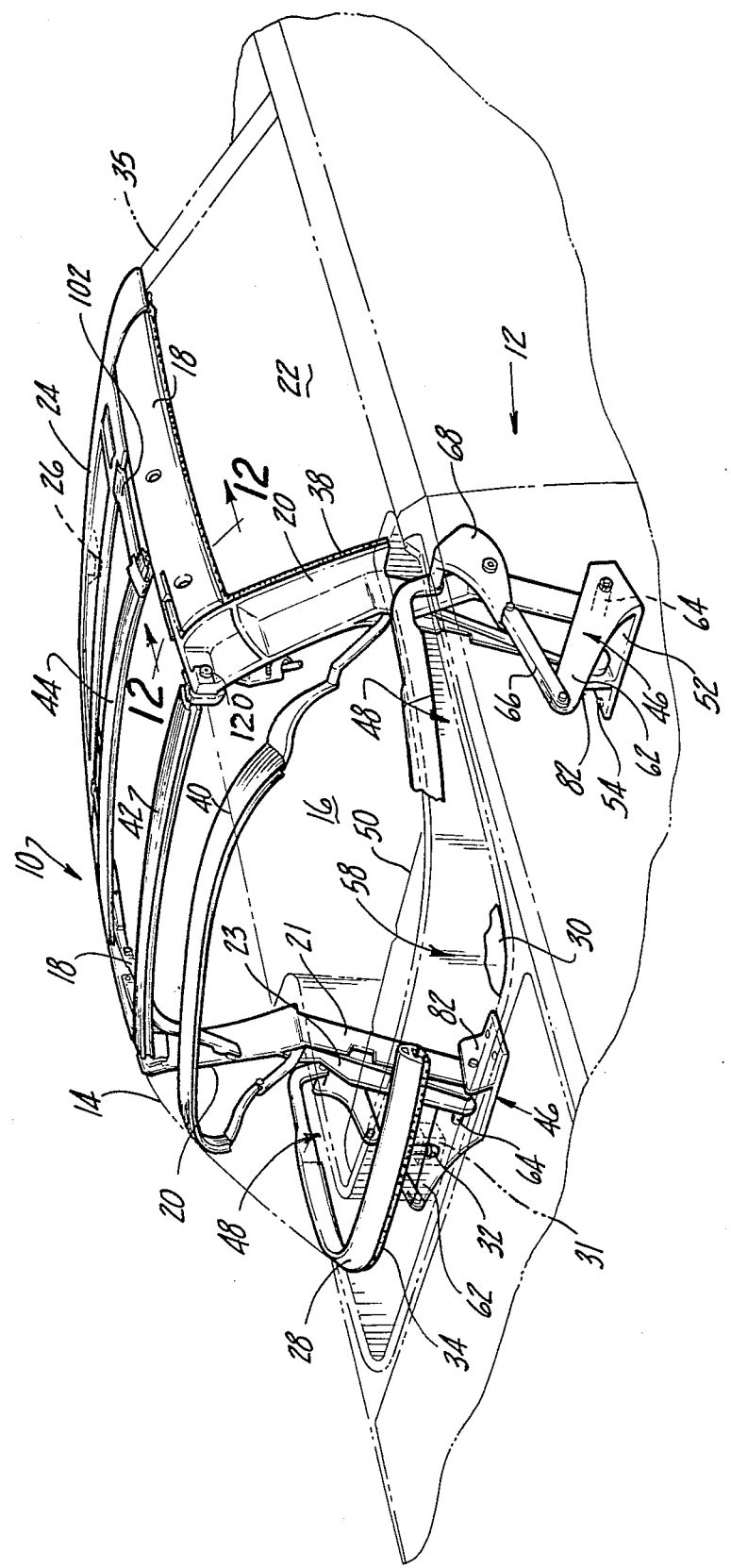
FIG. 1 is a perspective view of a convertible top frame according to the present invention with adjoining body and top structure shown in phantom.

Referring to the drawings and particularly FIG. 1, the convertible top frame 10 is shown together with adjacent body structures of a motor vehicle 12, shown in phantom outline. The convertible top frame 10 is adapted to provide a support for a fabric material top 14 so as to enclose the passenger compartment 16, which may include a clear plastic rear window section.

The convertible top frame 10 includes a pair of unitary side rails 18 which extend parallel to each other, generally horizontally with the top frame in the raised position. A pair of generally vertically disposed pillar members 20 are located on either side of the passenger compartment 16. Each of the side rails 18 is pivotally joined to a respective pillar member 20 at one end such as to allow relative angular motion between the side rails 18 and the pillar members 20 during the lowering of the convertible top frame 10, as will be described in further detail herein.

The side rails 18, as noted, extend forwardly from the upper end of a respective pillar member 20 to define a side window opening 22 on each side of the convertible top frame 10. Extending between the joined pairs of pillar members 20 and side rails 18 are a plurality of bow members which provide a support for the top 14.

The bow members include a header bow 24 extending between the forward end of the side rails 18 and which rests on the upper side of the windshield frame of the motor vehicle 12. A centrally located single latching mechanism 26 is provided for securing the header bow 24 to the windshield frame 35.

The header bow 24 is of relatively great transverse width to be of sturdy construction, but preferably of lightweight construction such as die cast aluminum. The relatively sturdy construction of the header bow 24 allows the use of a single latching mechanism 26 instead of a spaced pair of latches as per conventional practice.

There is also provided a bottom rear bow 28 which, with the convertible top frame 10 in the raised position, is positioned atop a cover deck 30 of the motor vehicle 12. The cover deck 30 may be raised during lowering of the convertible top frame 10 which will be described in detail hereinafter.

The bottom rear bow 28 is provided with a latching hook 32 engageable with an anchor 31 mounted to the cover deck, in turn driven by an actuating mechanism (not shown) such as to be drawn down tightly to stretch the top 14 after latching of the header bow 24.

The top 14 is secured about its lower periphery to the bottom rear bow 28 extending along the adjacent edges of each of the pillar members 20 and side rails 18, and over the header bow 24 to enclose the passenger compartment 16.

A weather strip 34 is provided acting between the undersurface of the bottom rear bow 28 and the mating surface of the cover deck 30. Weather stripping is also provided at 38 to seal with each of the side windows. There is also conventional sealing (not shown) at header bow 24 and the windshield frame 35.

There is also provided an intermediate rear bow 40, a top rear bow member 42, and an intermediate top bow member 44, each extending between the joined pairs of pillar members 20 and side rails 18 to provide support for the top 14. The top 14 may be secured to each of the bow members 42 and 44 as well.

The convertible top frame 10 is mounted to the motor vehicle 12 by anchor brackets 46, each positioned and bolted within body spaces consisting of side wells 48 located on either side of the passenger compartment 16 adjacent the rear seats. Each of the pillar members 20 is pivotally supported on cross tubes 64, welded thereto and supported on ears 62 and 82. Each pillar member 20 is generally of U-channel construction having side flanges 21 and 23 joined by a bottom web. Cross tube 64 is welded to the side flanges 21 and 23 such as to be rotated together therewith.

Each of the pillar members 20 extends generally vertically out of side wells 48 and angles inwardly to achieve sloping roof contours as indicated.

The anchor brackets 46 have a bottom flange 52 which has suitable openings to receive mounting bolts 54 which provide for adjustment fore and aft and side to side in order to accurately position the convertible top frame 10 with respect to the mating body portions of the motor vehicle 12 at assembly.

Each of the bow members is drivingly connected to a respective linkage system such as to cause particular motion of the respective bow members as the convertible top frame 10 is moved to the lowered, collapsed position, as will be described hereinafter in detail.

The lowering of the convertible top frame 10 is comprised of two primary movements; an initial primary movement of the pillar members 20, in which they are swung to the rear about pivot connections defined by cross tubes 64 mounted to anchor brackets 46, to be lowered to extend horizontally, parallel to the fore and aft axis of the vehicle. The pillar members 20, when lowered, are received and stowed within a body space 58 located to the rear of the passenger compartment 16.

The second primary motion of the convertible top frame 10 consists of a subsequent forward and downward pivoting motion of each of the side rails 18 into the body regions defined by the side wells 48. These two successive motions operate the respective linkages associated with each of the bow members, which are operated by the relative motion between each of the pillar members 20 and the fixed anchor brackets 46, as well as the relative motion subsequently occurring between each of the pillar members 20 and a respective joined side rail 18.

Figure 2:
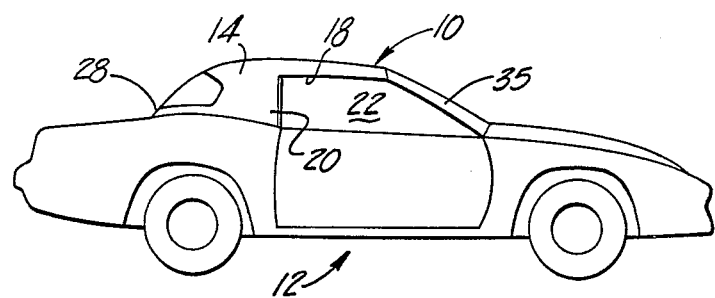
FIG. 2 is a side elevational view of a motor vehicle with a convertible top frame according to the present invention shown in the raised position.
Figure 3:
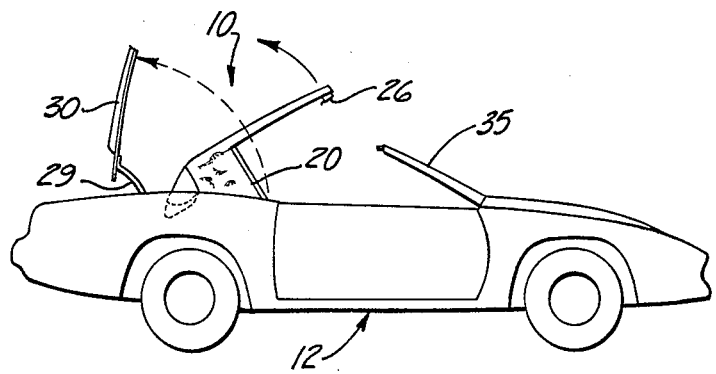
FIG. 3 is a side elevational view of the motor vehicle shown in FIG. 2 with the convertible top frame in the initial phase of lowering motion.
Figure 4:
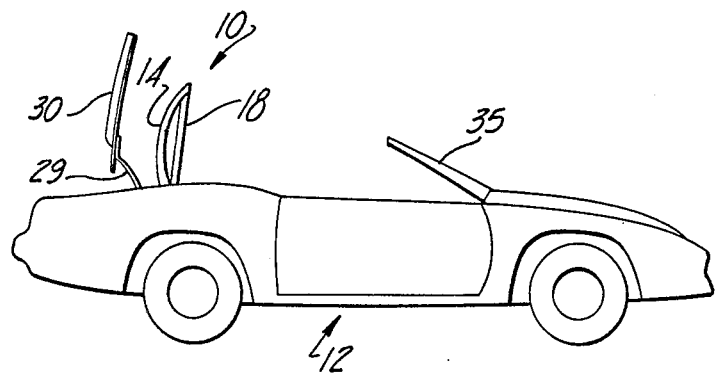
FIG. 4 is a side elevational view of the motor vehicle shown in FIGS. 2 and 3 with the convertible top frame in the position at the end of the first primary lowering movement.

The initial phase of the lowering motion is shown in FIGS. 2-4; the bottom rear bow 28 is first unlatched, as is the header bow 24. This allows lifting of the bottom rear bow 28 to allow opening of the cover deck 30 on hinges 29, as shown in FIG. 3, to allow the body space 58 and side well 48 to receive the convertible top frame 10 as it is lowered.

Pivoting movement of each of the pillar members 20 proceeds from the generally vertical position shown in FIG. 2 to the intermediate inclined position shown in FIG. 3, and finally to the generally horizontal position shown in FIG. 4.

During this phase of the motion of the convertible top frame 10, the linkages associated with the bottom rear bow 28 and the intermediate rear bow 40 are operated to cause a motion of the each of the respective bow members 28 and 40 to be positioned to be properly fit within the body space 58 to the rear of the rear seats 50.

Referring to FIG. 5, the bottom rear bow 28 linkage system is generally indicated at 60 and consists of ear 62 of anchor bracket 46 supporting the cross tube 64. An intermediate connecting lever 66 has one end pinned to the ear 62, and the opposite end to an end 72 of rocker lever 68. Rocker lever 68 is pivotally mounted at 70 to the pillar member 20 at a point intermediate its height.

The opposite end of the rocker lever 68 is pivotally connected at 76 to one end of the bottom rear bow 28. Thus, as the pillar member 20 is moved to the rear about the axis defined by cross tube 64, this causes the connecting lever 66 to pivot the rocker lever 68 about its axis 70, in turn drawing the bottom rear bow 28 forwardly to position the bow member 28 within the body space 58 for stowage.

There is also provided a second linkage system associated with the intermediate rear bow 40 which causes rearward and downward movement of the bow as the pillar members 20 are moved downwardly in the first phase of the primary lowering motions of the convertible top frame 10.

The second linkage system 78 includes a pivot lever 80 which is pivoted at its lower end (as seen in FIG. 5) to ear 82 integral with the anchor bracket 46. At its upper end, the pivot lever 80 is received within the space intermediate the side flanges 21 and 23 of the associated pillar member 20 and extends generally upwardly with the pillar member 20 in its vertical raised position. The upper end of the pivot lever 80 is pinned at 84 to one end of the second rocker lever 86 pivoted intermediate its length at 88 to the side flange 21 of the pillar member 20.

At its opposite end, the rocker lever 86 is pivoted at 90 to the intermediate rear bow 40.

Accordingly, as the pillar member 20 is rotated downwardly and to the rear, the pivot lever 80 forces the rocker lever 86 to be rotated such as to draw the arm 87 counterclockwise as shown in FIG. 5, drawing the intermediate rear bow 40 downwardly and also moving the bow member rearwardly to be properly positioned within the body space 58 in a stowed position intermediate the bottom rear bow 28 and the top rear bow 42.

During the second phase of lowering motion of the convertible top frame 10 to its stowed position, the side rails 18 are pivoted down and forward from the position shown in FIG. 4.

During such forward pivoting motion of the side rails 18, linkages associated with the intermediate top bow member 44, the header bow 24 and top rear bow 42 are activated by the relative angular motion between the pillar members 20 and the side rails 18. Particularly, the header bow 24 and the intermediate top bow member 44 are carried or swung to the rear as the side rails 18 are pivoted forward such as to move these bow members into the body space 58 to the rear of the rear seats 50 shown in FIG. 1, while the side rails move into the side walls 48, as also will be described in further detail hereinafter.

Figure 6:
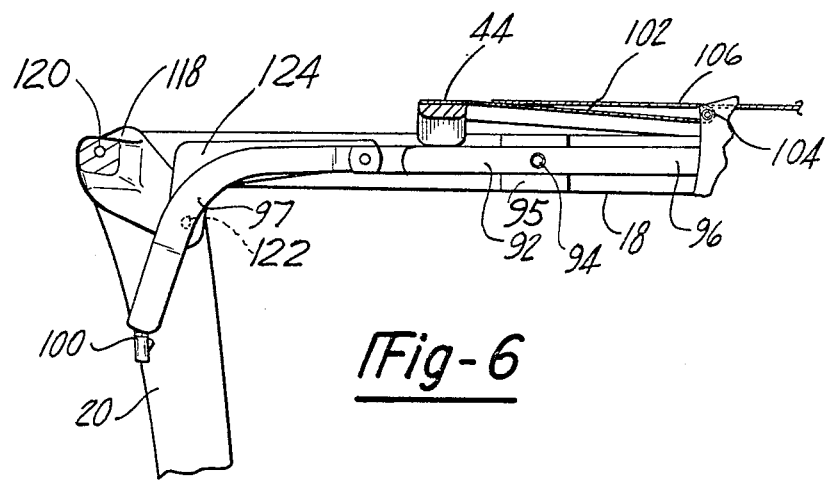
FIG. 6 is a side elevational interior view of a connected pillar member and side rail in the raised position, together with the associated swing arm assembly and sections through the supported bow members.
Figure 7:
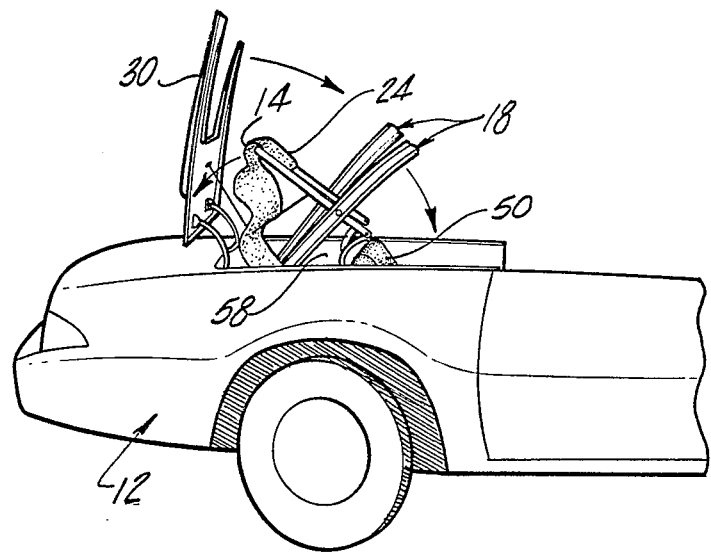
FIG. 7 is a fragmentary view of the rear section of the vehicle shown in FIGS. 2-4, at a slight perspective angle showing the convertible top frame advanced into the second primary lowering motion.

Referring to FIGS. 6-9, this motion is accomplished by swing arm assemblies 92 mounted to joined pairs of pillars members 20 and side rails 18. Each swing arm assembly 92 consists of a swing arm member 92 extending alongside the respective side rail 18 with the convertible top frame 10 in the raised position as shown in FIG. 6. The swing arm member 92 is mounted pivotally to the side rail 18 at 94 to a pivot tube 96. The pivot tube 96 is in turn located at a point intermediate the length of the side rail.

The forward end of the swing arm member 92 is received within a pivot plate 96 pivotally mounted at 98 to the underside of the header bow 24 such as to accommodate the swinging motion of the rail 18 about an axis transverse to the axis of the pivot 94. The forward end of the swing arm member 92 is round in shape so as to be able to rotate within the pivot tube 96 to accommodate relative changes in position in the various members as the swing arm assembly 92 is operated.

Pivotally connected at 99 to the other end of the swing arm member 92, is a link 97 which extends around the corner formed by the juncture of the side rail 18 and the pillar member 20. The opposite end of the link 97 is, anchored to the pillar member 20 by means of a pivot anchor 100 which accommodates pivoting and rotating movement as the side rail 18 is moved downwardly atop the pillar member 20.

The intermediate top bow member 44 is pivotally mounted to the header bow member 24 by means of rigid straps 102 pivoted at 104 to the rear edge of the header bow 24. During the rearward swinging motion of the header bow 24, the intermediate top bow member 44 swings upwardly to be positioned beneath the header bow 24. This linkage system is operated by the downward movement of the side rails 18 and results from the change in relative angular orientation between the side rails 18 and pillar members 20.

Figure 8:
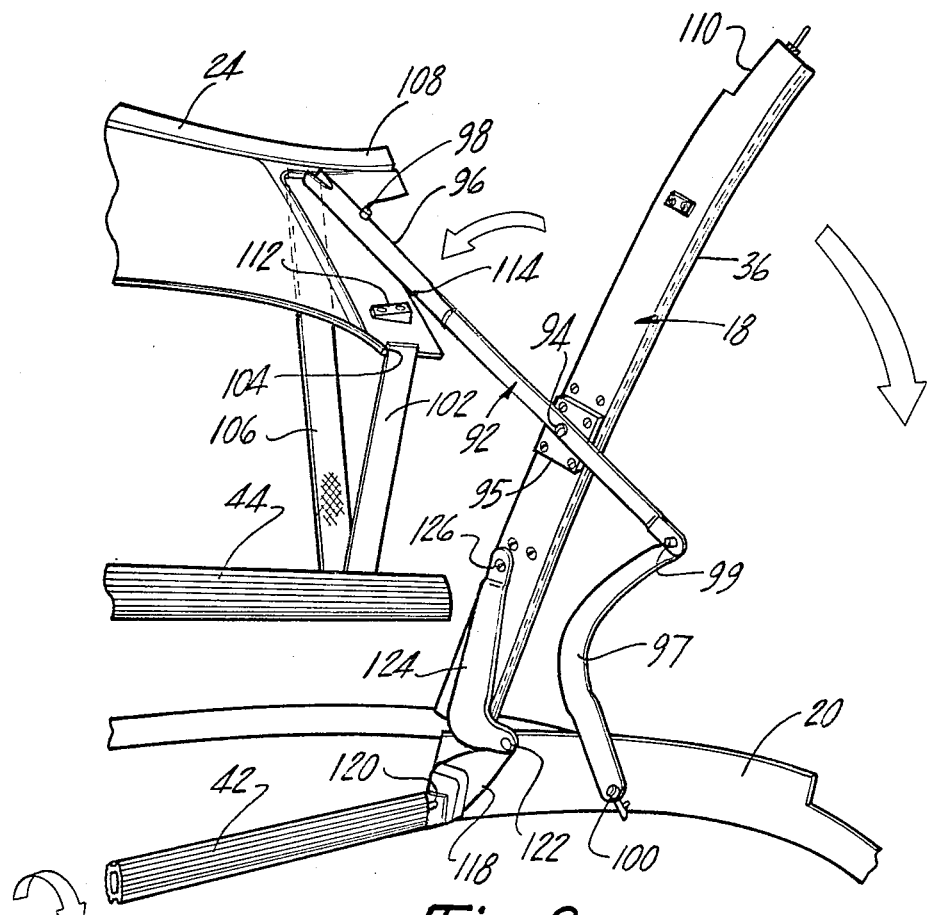
FIG. 8 is a fragmentary perspective view of the convertible top frame portion shown in FIG. 7.

The intermediate top bow member 44 is biased to so swing by means of elastic straps 106 lying atop the rigid straps 102 and anchored to the header bow 24 such as to urge the header bow 24 to be pivoted in a clockwise direction as viewed in FIGS. 6 and 8.

With the convertible top frame 10 in the raised position, the top 14 holds the intermediate top bow member 44 in the position shown in FIG. 6, and the elastic straps 106 are aligned so as to produce minimial bias force. As the top folds with the initial lowering motion of the convertible top frame 10, this allows the bias force of the elastic straps 106 to take effect.

The intermediate top bow member 44 is positioned in the down position lying atop but unconnected to the side rails 18 as is the header bow 24, whih has reduced size end tabs 108 seated within recesses 110 at the leading end of the side rails 18 to thus provide support, but allow a free movement of the header bow 24 and intermediate top bow member 44 in separating from the side rails 18 as described.

Thus, to summarize this aspect of the operation of the convertible top frame 10, as the top rails 18 are pivoted downwardly in the second phase of the primary lowering motions of the convertible top frame 10, the header bow 24 is swung to the rear by operation of the swing arm assembly 92 resulting from the change in angular position between side rails 18 and the pillar members 20. This is caused by the angle lever pivoting the swing arm assembly 92 in a counterclockwise direction as viewed in FIGS. 6, 7 and 8 carrying the header bow 24 to the rear. As the header bow 24 is carried to the rear and the fabric top collapses, this allows the elastic straps 106 to pivot the intermediate top bow member 44 such as to swing beneath the header bow 24 as the header bow 24 is inverted with continued downward pivoting motion of the side rails 18.

With continued downward collapsing movement of the side rails 18, the header bow 24 is positioned in the body space 58 to the rear seat region of the passenger compartment 16, with the intermediate top bow member 44 and top 14 folded beneath the header bow 24 in a stowed position.

As will be described hereinafter in further detail, the side rails 18 are pivoted at a skewed axis with respect to the pillar members 20 such that there is also a changing angular relationship therebetween in the horizontal plane.

This change in position is accommodated by the relative rotation allowed between the pivot plate 96 and header bow 24, as indicated in FIG. 9. The swing arm 92 and pivot tube 96 swing about the pivot 97 as indicated in FIG. 9, moving the pivot tube 96 away from the stop 112 as the pivot tube 96 moves outwardly with downward movement of the side rails 18.

The swing arm assembly 92 also rotates slightly in pivot tube 96, as the side rails 18 and pillars 20 pivot together FIG. 10 shows a stop pin 114 fixed to the swing arm 92 and received within an elongated slot 116 formed in pivot tube 96. Stop pin 114 thus limits the extent of the relative rotation therebetween. As previously described, pivot anchors 100 accommodate changes in angle of the pivot mount 98.

In order to allow the lowering motion of the side rails 18 to be conveniently accomplished by manual manipulation of a single side rail 18, the top rear bow member 42 is used as a torsion member, transmitting the rotation of one side rail 18 to the opposite side rail 18. This is achieved by means of a pair of arms 118, each fixed to a respective end of the top rear bow member 42 such as to be rotatable about pivot axis 120 on the pillar member 20 (FIGS. 1, 6, 8).

Each arm 118 is pinned at its outer end 122 to a lever arm 124, pinned to the side rail 18 at 126 (FIGS. 6, 8,). Thus, as the side rail 18 is rotated downwardly and pivoted with respect to the pillar member 20, a corresponding rotation of the top rear bow member 42 occurs, which acts through the opposite arm 118 and lever arm 124 to urge the side rail 18 to also be similarly pivoted in coordination therewith.

Figure 14:
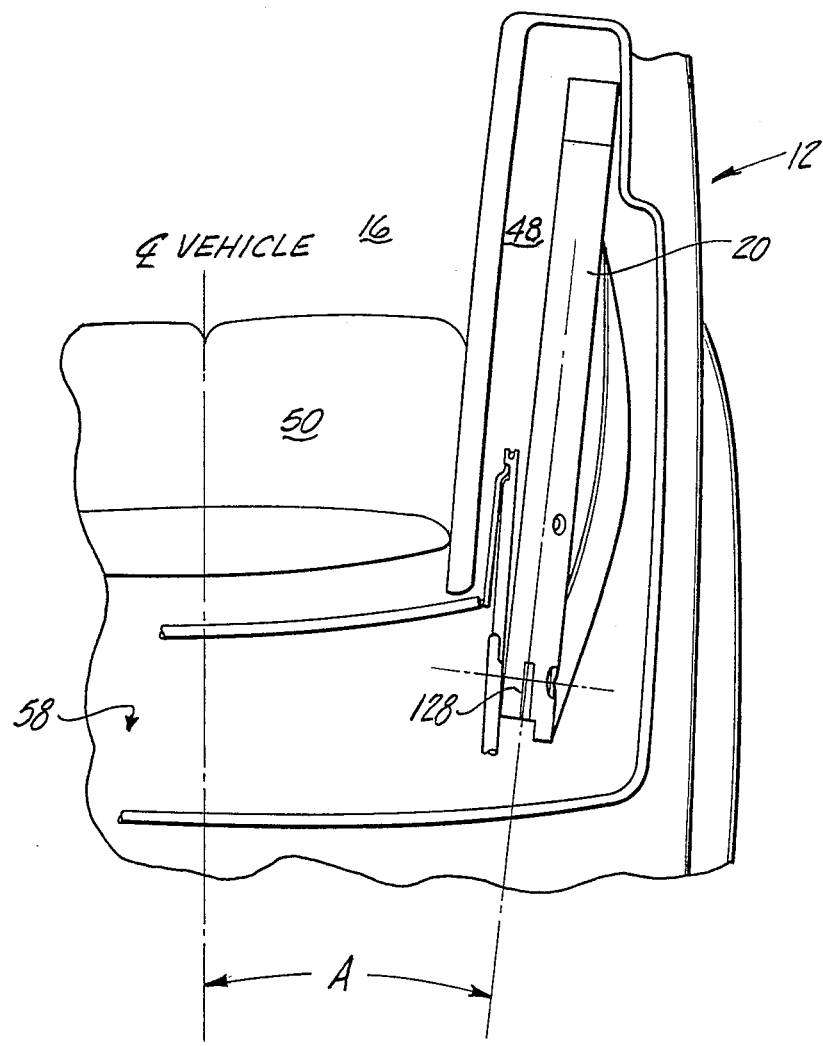
FIG. 14 is a fragmentary plan view of the side rail and pillar member in the collapsed, completely lowered position with the side rail moved into the vehicle body space alongside the passenger compartment in the rear seat region.
Figure 11:
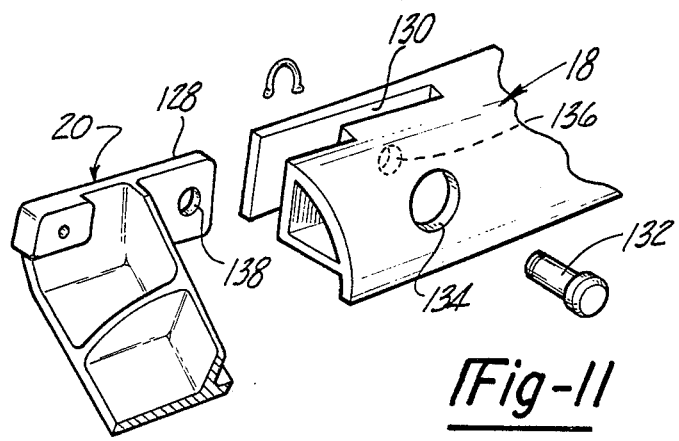
FIG. 11 is an exploded perspective view of the pivot connection between a side rail and a pillar member.
Figure 12:
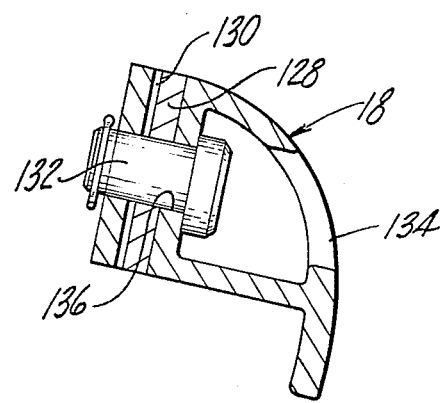
FIG. 12 is a sectional view taken through the pivot connection between the exploded view shown in FIG. 11.

According to one aspect of the present invention, the side rails 18, in pivoting on the pillar members 20 in the collapsed lowered position, are caused to move outwardly with respect to the vehicle center line such as to be able to be stowed in the side wells 48 to minimize the loss of passenger compartment space adjacent the rear seat 50. This is accomplished by providing the previously mentioned skewed axis of rotation at the pivot joint between the pillar member 20 and the side rails 18, skewed with respect to the fore and aft vehicle longitudinal dimension as shown in FIG. 14. Thus, a controlled pivoting motion between the side rail 18 and pillar member 20 is required to produce a guiding motion of the side rail 18 in order to insure such controlled pivoting motion. The pivot axis 120 provides good control on the respective members as best seen in FIGS. 11 and 12.

Each pillar member 20 is formed at its upper end with a flange extension 128 which is received within slot 130 formed within the end of the joined side rail 18.

Figure 13:
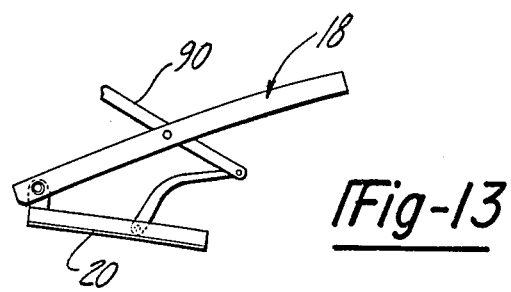
FIG. 13 is a side elevational fragmentary view of a side rail and pillar member with the side rail being pivoted forwardly and downwardly atop the pillar member.

A pivot pin 132 is received within an opening 134 and 136 and passes through an opening 138 formed in the flange extension 128. The cooperation of the flange extension 128 and slot 130 produces an adequate contact area to control the axis of rotation of the joined pillar member 20, as each side rail 18 moves downwardly as shown in FIG. 13 on the pillar member 20.

As seen in FIG. 14, the axis of such pivoted motion is skewed with respect to the center line of the vehicle so that the side rails 18 move outwardly in descending onto the pillar members 20, such as to move into the side wells 46 in the stowed position. This arrangement eliminates the need for any reduction in the passenger compartment 16.

Accordingly, it can be appreciated that the above-recited objects of the present invention have been achieved by the convertible top frame 10. The frame stows in a very compact space to provide a low profile contour of the vehicle with the convertible top frame 10 in the lowered position. In addition, the convertible top frame 10 in the stowed position does not require a reduction in the passenger compartment space such as to provide a very improved convertible top frame suitable for the down-sized vehicles common in today's automotive market.

The advantageous leverage afforded to the operator reduces the effort required in raising and lowering the top frame manually to modest levels.

The linkages used also provide relatively clean aesthetic lines and enable the use of unbroken weather strip components to thereby minimize the incidence of leakage about the top as well. The components are relatively simple and may be constructed at relatively low cost to be reliable in operation, all highly advantageous in the context of the automotive market.

I claim:

1. A convertible top for the body of a motor vehicle having a passenger compartment, said top adapted to be raised to cover the passenger compartment and lowered by folding into a body space region extending behind and beside said passenger compartment, comprising:
- a pair of spaced elongated pillar members, means pivotally anchoring each one of said pillar members to said body in said body space on a respective side of said passenger compartment so as to be swingable between a raised, substantially vertical position and a lowered, substantially horizontal position, said pillar members in said lowered position extending from said pivotal anchoring means towards the rear of said body;
- a pair of elongate unitary side rails;
- means connecting each side rail at one end to the upper end of a respective pillar member so as to extend leading ends thereof fowardly from said pillar member in said raised position;
- said connecting means allowing pivoting forward of each of said side rails into said body space regions alongside said passenger compartment and over said respective attached pillar member, with each of said pillar members in said lowered position;
- said connecting means establishing a pivot axis skewed with respect to the length of said body so that each of said side rails move outwardly of said body in being pivoted to extend forwardly and over said respective lowered pillar member;
- a plurality of elongate bow members extending between said pair of pillar members and connected side rails, said bow members spaced apart to define a top support, and bow mounting means mounting each of said bow members to a respective one of said pillar members and connected side rails, said bow mounting means causing positioning of said plurality of bow members in said body spaced region to the rear of said passenger compartment upon movement of said pair of pillar members and connected side rails to said positions whereat said pillar members are in said lowered, horizontal position and said side rails are in said forward position in said body space regions on either side of said passenger compartment; and,
- a flexible top mounted to extend across the space between said pair of pillar members and connected side rails and above said plurality of bow members, with said frame in said raised position, and folded into said body space with said frame in said lowered position.

2. The convertible top according to claim 1 wherein one of said plurality of bow members comprises a header bow positioned across said leading ends of said side rails, but free from attachment thereto with said pillar members in said raised position, and said side rails extending therefrom substantially horizontally and linkage means drivingly connected to said header bow member and said side rails to swing said header bow rearwardly into said body space behind said passenger compartment as said side rails are pivoted into said body space regions on either side of said passenger compartment.

3. The convertible top according to claim 2 wherein said linkage means includes a pair of elongate swing arms, one swing arm extending alongside each of said side rails with said roof assembly in its raised position, and each swing arm pivotally mounted to a respective side rail at a point intermediate its length thereof, said linkage means including means drivingly connecting a forward end of each swing arm to a respective end of said header bow; said linkage means further including an angle link pivotally mounted to each pillar member at one end and to a respective swing arm at a respective point to the rear of said pivoting of said respective swing arm to said side rail, causing rotation of said section of said swing arms forward to said pivots so as to carry said header bow to the rear as said side rails are pivoted forwardly on said pillar members.

4. The convertible top according to claim 3 wherein said means drivingly connecting each of said swing arms to said header bow comprises a pair of elongate members pivotally mounted at one end to either end of said header bow to allow outward pivoting motion as said side rails are pivoted downwardly, each of said elongated members interfit with a respective swing arm to allow limited relative rotation therebetween, whereby said pivoting movement of said elongate members and said relative rotation between said elongate members and said swing arms accommodates the changing angular relationship between said swing arm and said header bow as said side rails are pivoted downwardly.

5. A convertible top for the body of a motor vehicle having a passenger compartment, said top adapted to be raised to cover the passenger compartment and lowered by folding into a body space region extending behind and beside said passenger compartment, comprising:
- a pair of spaced elongate pillar members, means pivotally anchoring each one of said pillar members to said body in said body space on a respective side of said passenger compartment so as to be swingable between a raised, substantially vertical position and a lowered, substantially horizontal position, said pillar members in said lowered position extending from said pivotal anchoring means towards the rear of said body;
- a pair of elongate unitary side rails;
- means connecting each side rail at one end to the upper end of a respective pillar member so as to extend leading ends thereof forwardly from said pillar member in said raised position;
- said connecting means allowing pivoting forward of each of said side rails into said body space regions alongside said passenger compartment and over said respective attached pillar member, with each of said pillar members in said lowered position;
- a plurality of elongate bow members extending between said pair of pillar members and connected side rails, said bow members spaced apart to define a top support, and bow mounting means mounting each of said bow members to a respective one of said pillar members and connected side rails, said bow mounting means causing positioning of said plurality if bow members in said body space region to the rear of said passenger compartment upon movement of said pair of pillar members and connected side rails to said positions whereat said pillar members are in said lowered, horizontal position and said side rails are in said forward position in said body space regions on either side of said passenger compartment; and,
- one of said plurality of bow members comprising a header bow positioned across said leading ends of said side rails, but free from attachment thereto with said pillar members in said raised position and said side rails extending therefrom substantially horizontally and header linkage means drivingly connected to said header bow member and said side rails to swing said header bow rearwardly into said body space behind said passenger compartment as said side rails are pivoted into said body space regions on either side of said passenger compartments;

a flexible top mounted to extend across the space between said pair of pillar members and connected side rails and above said plurality of bow members, with said frame in said raised position, and folded into said body space with said frame in said lowered position.

6. The convertible top according to claim 5 wherein said plurality of bow members further includes an intermediate top bow spaced to the rear of said header bow and extending across said side rails with said roof assembly in its raised position and means mounting said intermediate top bow to said header bow, whereby said header linkage means also moves said intermediate top bow into said body space region to the rear of said passenger compartment as said side rails are pivoted forwardly over said pillar members.

7. the convertible top according to claim 6 wherein said intermediate top bow is pivotally mounted to said header bow by a pair of pivot links extending therebetween, and also including a pair of elastic members causing said intermediate top bow to swing onto said header bow as said header bow is swung into said body space region to the rear of said body compartment.

8. The convertible top according to claim 5 wherein said header linkage means includes a pair of elongate swing arms, one swing arm extending alongside each of said side rails with said roof assembly in its raised position, and each swing arm pivotally mounted to a respective side rail at a point intermediate its length thereof, said header linkage means including means drivingly connecting a forward end of said swing arm to one end of said header bow, said header linkage means further including an angle link pivotally mounted to each pillar member at one end and to a respective swing arm at a respective point to the rear of said pivoting of said respective swing arm to said side rail, causing rotation of said section of said swing arms forward of said pivots so as to carry said header bow to the rear as said side rails are pivoted forwardly on said pillar members.

9. A convertible top for the body of a motor vehicle having a passenger compartment, said top adapted to be raised to cover the passenger compartment and lowered by folding into a body space region extending behind and beside said passenger compartment, comprising:

a pair of spaced elongate pillar members, means pivotally anchoring each one of said pillar members to said body in said body space on a respective side of said passenger compartment so as to be swingable between a raised, substantially vertical position and a lowered, substantially horizontal position, said pillar members in said lowered position extending from said pivotal anchoring means towards the rear of said body;

a pair of elongate unitary side rails;

means connecting each side rail at one end to the upper end of a respective pillar member so as to extend leading ends thereof forwardly from said pillar member in said raised position;

said connecting means allowing pivoting forward of each of said side rails into said body space regions alongside said passenger compartment and over said respective attached pillar member, with each of said pillar members in said lowered position;

a plurality of elongate bow members extending between said pairs of pillar members and connected side rails, said bow members spaced apart to define a top support, and bow mounting means mounting each of said bow members to a respective one of said pair of pillar members and connected side rails, said bow mounting means causing positioning of said plurality of bow members in said body space region to the rear of said passenger compartment upon movement of said pair of pillar members and connected side rails to said positions whereat said pillar members are in said lowered, horizontal position and said side rails are in said forward position in said body space regions on either side of said passenger compartment, said plurality of bow members including an elongate bow member substantially aligned with the point of connection between each of said side rails and a respective one of said pillar members, and further including linkage means drivingly connecting each end of said bow member, to a respective pillar member and connected side rails, causing rotation of said bow member as either of said side rails is pivoted on a respective pillar member to cause corresponding pivotal rotation of the opposite side rail, whereby causing parallel pivoting motion of both side rails and said pillar members by pivoting of either of said side rails; and, a flexible top mounted to extend across the space between said pair of pillar members and connected side rails and above said plurality of bow members, with said frame in said raised position, and folded into said body space with said frame in said lowered position.

10. The convertible top according to claim 9 wherein said means drivingly connecting each end of said bow member to said pillar members and side rails includes link pairs comprised of first and second links, said first link of each pair fixed to a respective end of said bow member and pivotally connected to a respective pillar member each of said second link of each pair angled and pivotally connected to a respective one of said side rails, said first and second link in each pair pivoted together.

11. A convertible top for the body of a motor vehicle having a passenger compartment, said top adapted to be raised to cover the passenger compartment and lowered by folding into a body space region extending behind and beside said passenger compartment, comprising:

a pair of spaced elongate pillar members, means pivotally anchoring each one of said pillar members to said body in said body space on a respective side of said passenger compartment so as to be swingable between a raised, substantially vertical position and a lowered, substantially horizontal position, said pillar members in said lowered position extending from said pivotal anchoring means towards the rear of said body;

a pair of elongate unitary side rails;

means connecting each side rail at one end to the upper end of a respective pillar member so as to extend leading ends thereof forwardly from said pillar member in said raised position;

said connecting means allowing pivoting forward of each of said side rails into said body space regions alongside said passenger compartment and over said respective attached pillar member, with each of said pillar members in said lowered position;

a plurality of elongate bow members extending between said pairs of pillar members and connected side rails, said bow members spaced apart to define a top support, and bow mounting means mounting each of said bow members to a respective pair of pillar members and connected side rails, said bow mounting means causing positioning of said plurality of bow members in said body space region to the rear of said passenger compartment upon movement of said pairs of pillar members and connected side rails to said positions whereat said pillar members are in said lowered, horizontal position and said side rails are in said forward position in said body space regions on either side of said passenger compartment, said plurality of bow members including at least one rear bow extending between said pillar members, and further including linkage means drawing said at least one rear bow forwardly as said pillar members are lowered; and, a flexible top mounted to extend across the space between said pairs of pillar members and connected side rails and above said plurality of bow members, with said frame in said raised position, and folded into said body space with said frame in said lowered position.

12. The convertible top according to claim 11 wherein said plurality of bow members includes an intermediate rear bow member spaced above said at least one rear bow member and extending between said pillar members, and further linkage means acting on said second rear bow member drawing said intermediate bow member downwardly to cause folding of said flexible top as said pillar members are lowered.

13. The convertible top according to claim 12 wherein said anchoring means comprises a pair of anchor brackets each adapted to be mounted with one of said body space regions on either side of said passenger compartments, and wherein said pillar members are each mounted to a respective anchor bracket, and wherein each of said linkage means acting on said one and intermediate bow members are drivingly connected to a respective one of said anchor brackets.

* * * * *